United States Patent
Oya et al.

(10) Patent No.: US 11,888,361 B2
(45) Date of Patent: Jan. 30, 2024

(54) ROTOR TOOTH CRACK INSPECTION METHOD

(71) Applicant: Mitsubishi Electric Corporation, Tokyo (JP)

(72) Inventors: Takashi Oya, Tokyo (JP); Masanori Uchimura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 716 days.

(21) Appl. No.: 17/046,369

(22) PCT Filed: May 25, 2018

(86) PCT No.: PCT/JP2018/020150
§ 371 (c)(1),
(2) Date: Oct. 9, 2020

(87) PCT Pub. No.: WO2019/225003
PCT Pub. Date: Nov. 28, 2019

(65) Prior Publication Data
US 2021/0083559 A1    Mar. 18, 2021

(51) Int. Cl.
*H02K 15/02* (2006.01)
*G01N 29/04* (2006.01)
*H02K 1/26* (2006.01)

(52) U.S. Cl.
CPC ........... *H02K 15/02* (2013.01); *G01N 29/041* (2013.01); *H02K 1/26* (2013.01)

(58) Field of Classification Search
CPC ......... H02K 15/02; H02K 1/26; G01N 29/041
See application file for complete search history.

(56) References Cited

U.S. PATENT DOCUMENTS

| | | | |
|---|---|---|---|
| 7,500,396 B2 * | 3/2009 | Bentzel | G01N 29/043 73/660 |
| 8,047,078 B2 | 11/2011 | Koinuma et al. | |
| 10,197,538 B2 | 2/2019 | Alford et al. | |

(Continued)

FOREIGN PATENT DOCUMENTS

| JP | S62291560 A | 12/1987 |
|---|---|---|
| JP | 02150766 A | 11/1990 |

(Continued)

OTHER PUBLICATIONS

International Search Report (PCT/ISA/210) dated Jul. 3, 2018, by the Japan Patent Office as the International Searching Authority for International Application No. PCT/JP2018/020150.

(Continued)

*Primary Examiner* — Bernard Rojas
(74) *Attorney, Agent, or Firm* — BUCHANAN INGERSOLL & ROONEY PC

(57) ABSTRACT

The occurrence angle of a crack with respect to a reference line passing by a tooth shoulder portion perpendicularly to the radial direction of a tooth is defined as α. A phased array probe is placed in advance at a position on the outer circumferential surface of a retaining ring that is located in a direction estimated to be perpendicular to the occurrence angle α, and sector scan is performed with an ultrasonic beam radiated from the phased array probe, thereby inspecting whether or not the crack has occurred at the tooth shoulder portion.

2 Claims, 4 Drawing Sheets

(56) References Cited

U.S. PATENT DOCUMENTS

| | | | |
|---|---|---|---|
| 2003/0221497 A1* | 12/2003 | Murphy | ............... F01D 25/285 |
| | | | 73/112.01 |
| 2005/0198821 A1* | 9/2005 | Reville | .................... B23C 1/20 |
| | | | 29/889.1 |
| 2009/0320600 A1 | 12/2009 | Koinuma et al. | |
| 2017/0219533 A1 | 8/2017 | Alford et al. | |

FOREIGN PATENT DOCUMENTS

| | | |
|---|---|---|
| JP | 2001099817 A | 4/2001 |
| JP | 2010008212 A | 1/2010 |
| JP | 2017138315 A | 8/2017 |

OTHER PUBLICATIONS

Written Opinion (PCT/ISA/237) dated Jul. 3, 2018, by the Japan Patent Office as the International Searching Authority for International Application No. PCT/JP2018/020150.

* cited by examiner

ROTOR TOOTH CRACK INSPECTION METHOD

TECHNICAL FIELD

The present disclosure relates to a rotor tooth crack inspection method for inspecting whether or not there is a crack caused by stress occurring at a shoulder portion of a tooth composing a rotor of a rotary electric machine, using ultrasonic waves.

BACKGROUND ART

In a rotor of a turbine electric generator which is an example of a rotary electric machine, a plurality of slots are radially formed in the radial direction so as to be arranged along the circumferential direction of an armature core, teeth are formed between the slots, and field coils for generating a magnetic field are wound around the teeth and stored in the slots.

While the field coils are layered and arranged in the slots as described above, a wedge having a wedge shape is inserted into a groove formed at a shoulder portion of each tooth so that the field coil does not come out of the slot by a centrifugal force due to rotation of the rotor. Thus, since the wedge is for retaining the field coil in the slot, the shoulder portion of the tooth is directly subjected to the centrifugal force of the field coil via the wedge.

Meanwhile, at the coil end of the rotor, a retaining ring is fitted by shrink fit or the like to fix the field coil protruding out from the armature core, and therefore the shoulder portion of the tooth is also subjected to stress constantly due to the retaining ring.

Thus, there is a possibility that crack occurs at the shoulder portion of the tooth due to great stress as described above, and it is necessary to regularly inspect whether or not a crack has occurred. For this inspection, conventionally, since the retaining ring is shrink-fitted, after the rotor is pulled out from a stator, the shrink-fitted retaining ring is detached and the wedge is pulled out, and thereafter, a solvent is applied to the shoulder portion of the rotor tooth, to perform penetrant inspection, whereby the size or the direction of a crack is inspected.

As described above, conventionally, in a penetrant inspection for inspecting whether or not a crack has occurred at the shoulder portion of the tooth, a pull-out step of pulling out the rotor from the stator, a retaining ring detachment step of detaching the shrink-fitted retaining ring from the rotor end, and a wedge pull-out step of pulling out the wedge from the groove in the tooth shoulder portion, are performed and then a solvent is applied to a part where a crack is estimated to occur, to perform the penetrant inspection. Therefore, such a large-scale work of pulling the rotor from the stator needs to be performed at the time of a regular inspection, and other processing works are required. Thus, a lot of effort and time are required for the penetrant inspection.

In order to simplify such a penetrant inspection for inspecting whether or not a crack has occurred at the tooth shoulder portion, the following method has been conventionally proposed: a pair of ultrasonic wave probes for wave transmission and wave reception are used, both ultrasonic wave probes are provided at the outer circumference of the rotor, ultrasonic waves are transmitted from one ultrasonic wave probe, and ultrasonic waves reflected by a crack are received by the other ultrasonic wave probe, thereby inspecting whether or not a crack has occurred (see, for example, Patent Document 1 below).

CITATION LIST

Patent Document

Patent Document 1: Japanese Laid-Open Patent Publication No. 62-291560

SUMMARY OF THE INVENTION

Problems to be Solved by the Invention

However, in the case of using a pair of ultrasonic wave probes for wave transmission and wave reception as in conventional case, it is necessary that, considering efficiency or transmission/reception time for ultrasonic waves, one or both of the pair of ultrasonic wave probes for wave transmission and wave reception are placed at shifted positions so as to be optimally located and then whether or not a crack has occurred is inspected at least twice. Thus, it takes time to set their positions, so that it is difficult to efficiently conduct the flaw detection inspection within a short time. On the other hand, if the pair of ultrasonic wave probes for wave transmission and wave reception are not placed at optimum positions, crack detection accuracy is deteriorated.

Further, there has conventionally been known a phased array flaw detection technology in which, using a phased array probe configured with multiple piezoelectric elements arranged in an array form, a group of a plurality of piezoelectric elements is operated with a predetermined time delay in accordance with a command from a control unit, so as to control the focal length or the angle of an ultrasonic beam that is transmitted/received, thereby inspecting whether or not a crack has occurred.

However, even in the case of inspecting whether or not a crack has occurred at the tooth shoulder portion using such a phased array probe, crack detection accuracy is still low unless the direction in which a crack progresses from the tooth shoulder portion can be estimated with a high probability in advance.

That is, when ultrasonic beams are transmitted and received in the direction perpendicular to the crack generated direction, the wave transmission/reception efficiency is highest and thus crack detection accuracy is also high. Therefore, unless the phased array probe is placed at such an optimum position, efficiency of transmission and reception of ultrasonic beams is low, so that crack detection accuracy is deteriorated. In addition, in the case of placing the phased array probe at an optimum position as described above, it takes time to search for the optimum position with conventional technology. Thus, as in Patent Document 1, it is difficult to efficiently conduct the flaw detection inspection within a short time.

The present disclosure has been made to solve the above problems, and an object of the present disclosure is to provide a rotor tooth crack inspection method capable of easily and reliably inspecting whether or not a crack has occurred at the tooth shoulder portion, from a part on the retaining ring fitted for fixing field coils, within a short time.

Solution to the Problems

A rotor tooth crack inspection method according to the present disclosure is a rotor tooth crack inspection method for a rotary electric machine in which a rotor is rotatably provided inside a stator, the rotor has a plurality of slots radially formed in a radial direction so as to be arranged along a circumferential direction of an armature core and has teeth between the slots, field coils for generating a magnetic field are wound around the teeth and stored in the slots, and a retaining ring for fixing coil ends of the field coils is fitted at an end part on an outer circumferential side of the teeth, the rotor tooth crack inspection method inspecting whether or not a crack has occurred at a shoulder portion of each tooth, the rotor tooth crack inspection method including: placing, in advance, a phased array probe at a position on an outer circumferential surface of the retaining ring that is located in a direction estimated to be perpendicular to an occurrence angle α which is defined as an occurrence angle of a crack with respect to a reference line passing by the tooth shoulder portion perpendicularly to a radial direction of the tooth, and performing sector scan with an ultrasonic beam radiated from the phased array probe, to inspect whether or not the crack has occurred.

Effect of the Invention

In the rotor tooth crack inspection method according to the present disclosure, an optimum position on the outer circumferential surface of the retaining ring at which efficiency of transmission and reception of ultrasonic waves is highest and thus crack detection accuracy is also high is specified in advance, and after the phased array probe is placed at the optimum position, sector scan is performed with an ultrasonic beam radiated from the phased array probe. Thus, effort for searching for an optimum placement position of the probe on the retaining ring can be eliminated, and efficiency of transmission and reception of the ultrasonic beam is high. Therefore, it is possible to easily and reliably inspect whether or not a crack has occurred at the tooth shoulder portion, from a part on the retaining ring, within a short time.

DESCRIPTION OF EMBODIMENTS

Embodiment 1

Figure 1:
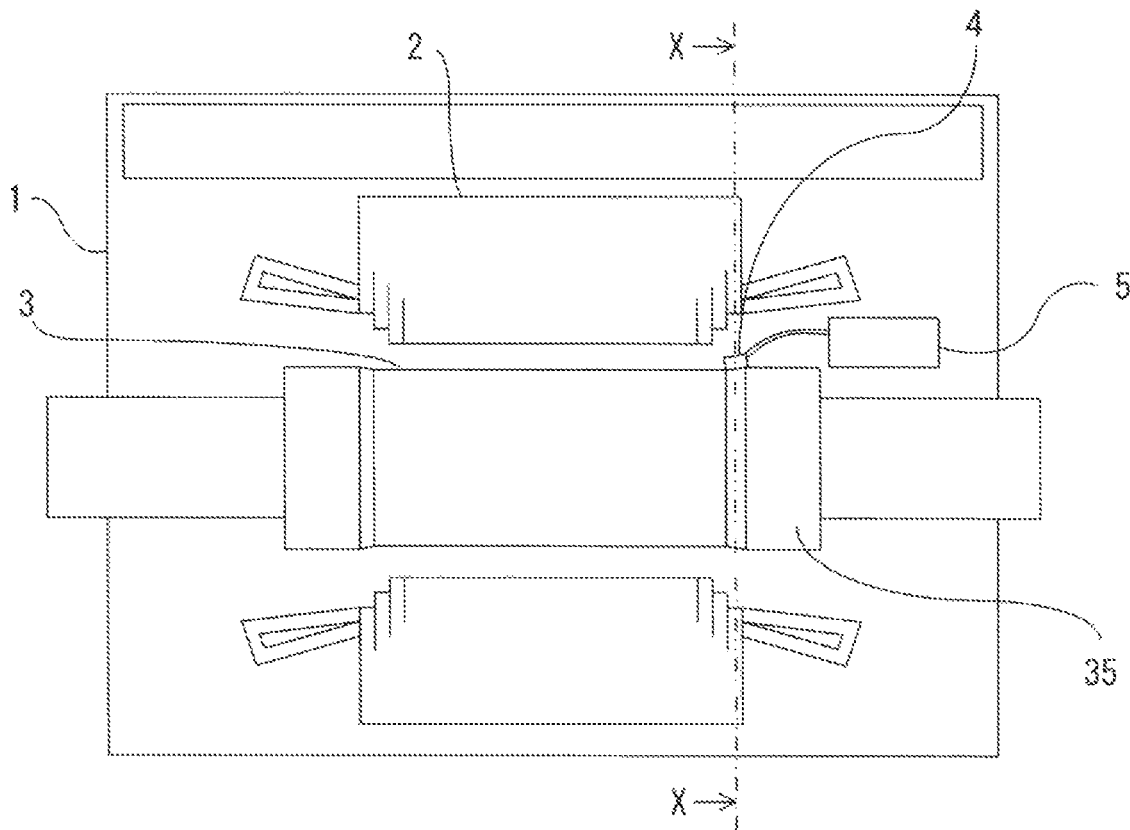
FIG. 1 is a plan view showing a schematic structure of a turbine electric generator to which a rotor tooth crack inspection method according to embodiment 1 is applied.
Figure 2:
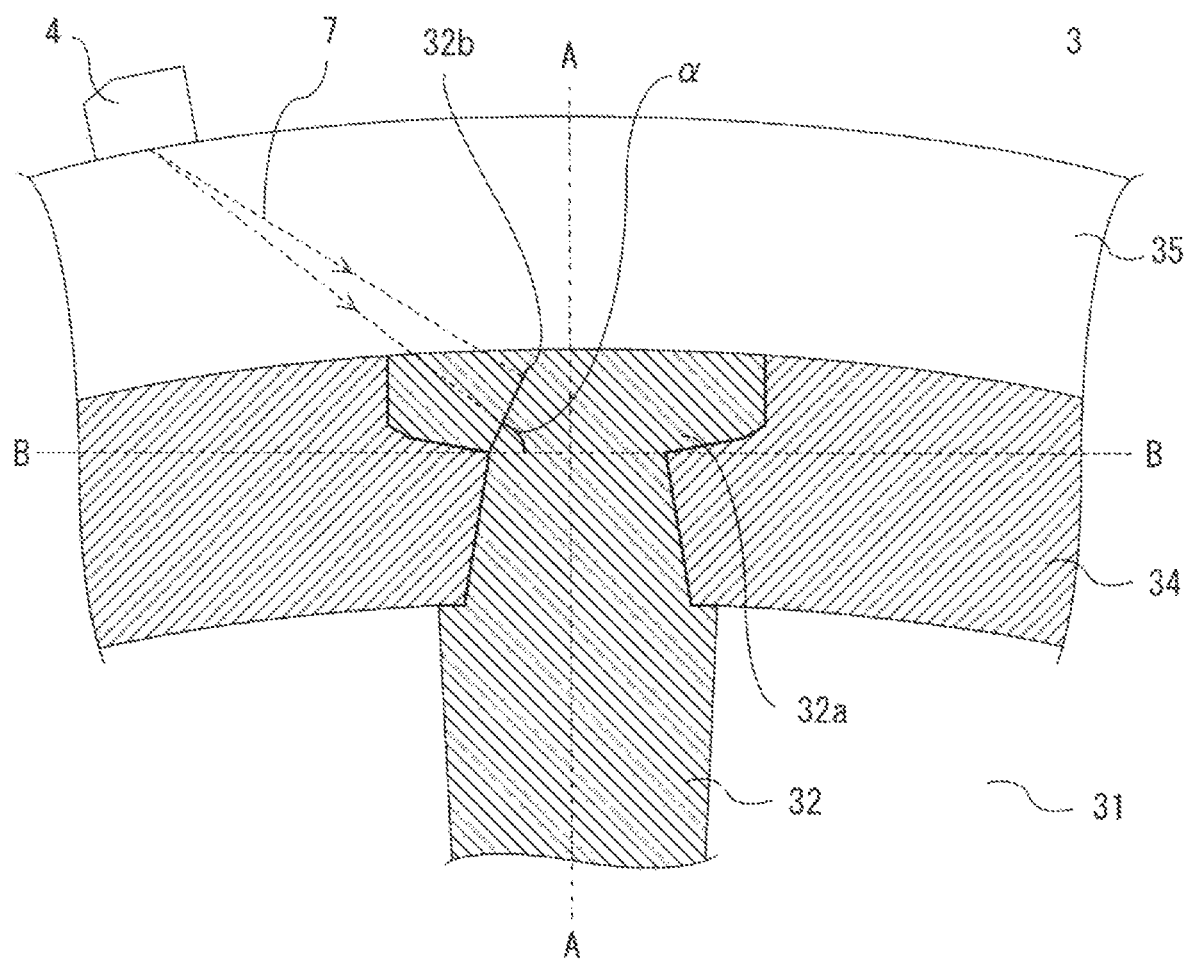
FIG. 2 is a partial sectional view along line X-X in FIG. 1.

FIG. 1 is a plan view showing a schematic structure of a turbine electric generator to which a rotor tooth crack inspection method according to embodiment 1 of the present disclosure is applied, and FIG. 2 is a partial sectional view along line X-X in FIG. 1.

In the turbine electric generator, a rotor 3 is rotatably provided inside a stator 2 supported by a frame 1. In the rotor 3, a plurality of slots 31 are radially formed in the radial direction so as to be arranged along the circumferential direction of an armature core, teeth 32 are formed between the slots 31, and field coils for generating a magnetic field (not shown) are wound around the teeth 32 and stored in the slots 31.

The field coils are layered and arranged in the slots 31, and in order that each field coil does not come out of the slot 31 by a centrifugal force due to rotation of the rotor 3, a wedge 34 having a wedge shape is inserted into a groove formed at a tooth shoulder portion 32a, and further, a cylindrical retaining ring 35 for fixing coil ends of the field coils is fitted by shrink fit or the like at an end part on the outer circumferential side of the teeth 32.

Therefore, at the tooth shoulder portion 32a of the rotor 3, compressive stress due to fitting of the retaining ring 35 by shrink fit or the like and tensile stress via the wedge 34 due to a centrifugal force of the field coil during operation of the turbine electric generator are repeatedly applied, leading to occurrence of a crack 32b.

Figure 3:
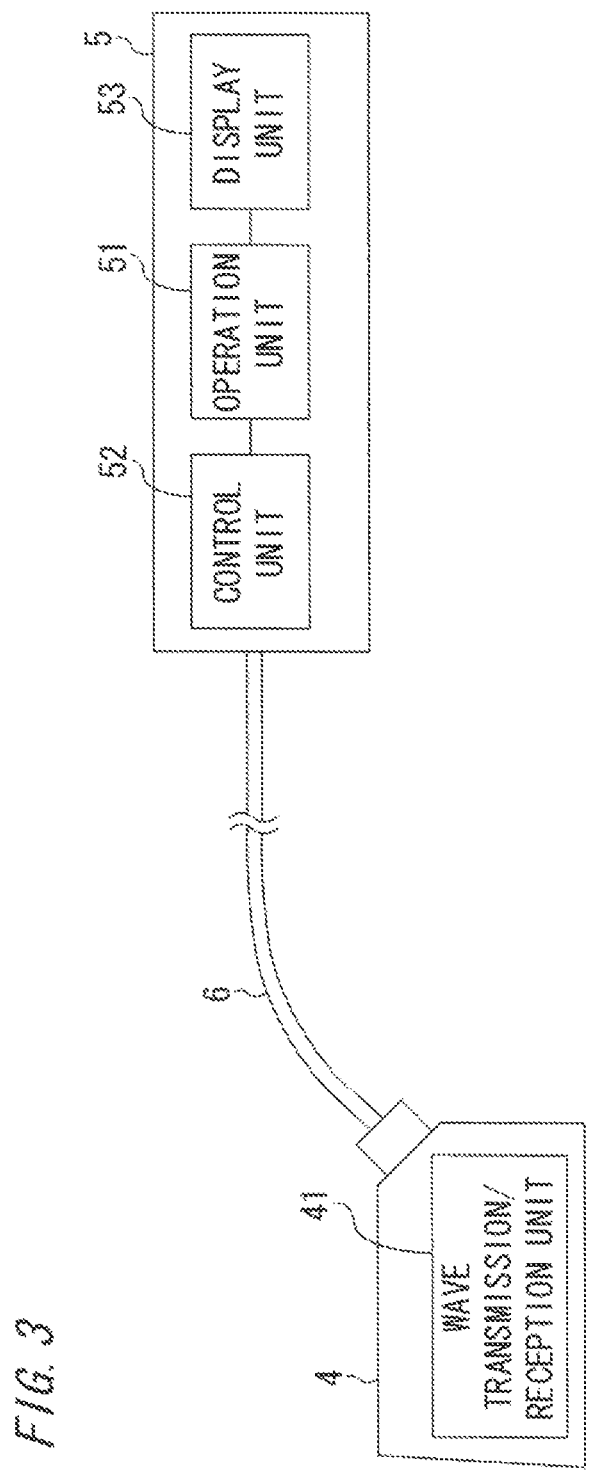
FIG. 3 is a configuration diagram showing a schematic system of an ultrasonic flaw detection device provided with a phased array probe, which is used in the case of applying the inspection method according to embodiment 1.

FIG. 3 is a configuration diagram showing a schematic system of an ultrasonic flaw detection device provided with a phased array probe, which is used in the case of applying the inspection method according to embodiment 1.

Here, a phased array probe 4 includes a wave transmission/reception unit 41 in which multiple piezoelectric elements for transmitting and receiving ultrasonic waves are arranged in an array form. In accordance with a command from a control unit 52 described later, the wave transmission/reception unit 41 operates a group of a plurality of piezoelectric elements with a predetermined time delay, thereby controlling the focal length or the angle of an ultrasonic beam 7 that is transmitted/received.

An ultrasonic flaw detection device body 5 includes an operation unit 51 for setting the frequency, the radiation angle width, and the like of the ultrasonic beam 7 to be radiated from the phased array probe 4, the control unit 52 which controls transmission/reception of the ultrasonic beam 7 by the wave transmission/reception unit 41 of the phased array probe 4 and generates a flaw detection image on the basis of a received ultrasonic wave signal, and a display unit 53 for displaying the flaw detection image. The phased array probe 4 and the ultrasonic flaw detection device body 5 are connected to each other via a cable 6 for control.

Next, a method for inspecting whether or not a crack has occurred at a tooth shoulder portion using the ultrasonic flaw detection device configured as shown in FIG. 3 will be described.

The inventors of the present application have conducted earnest research by collecting a lot of information about cases of cracks that actually occurred at tooth shoulder portions of rotors, and thus have found out that cracks occur so as to concentrate within a certain direction range. That is, in FIG. 2, with a center line A extending from the center of the rotor 3 in the radial direction of the tooth 32, where a line passing by the tooth shoulder portions 32a in a direction perpendicular to the center line A is defined as reference line B, it has been found that a crack 32b occurs within a certain angle range of 45 degrees to 60 degrees from the reference line B to the radially outward direction.

The reason why the crack 32b occurs within the certain angle range as described above is considered as follows: the groove shape at the tooth shoulder portion 32a is almost the same in any types of electric generators, and great stress applied to the tooth shoulder portion 32a is due to a tightening force of the retaining ring 35 and a centrifugal force of the field coil.

As described above, in any types of electric generators, the groove shape at the tooth shoulder portion 32a is almost the same, and therefore a crack 32b actually occurring at the tooth shoulder portion 32a of the rotor 3 concentrates within a certain direction angle range. That is, in FIG. 2, with a center line A extending from the center of the rotor 3 in the radial direction of each tooth 32, where a line passing by the tooth shoulder portions 32a perpendicularly to the center line A is defined as reference line B, the occurrence angle α of the crack 32b is within a range of 45 degrees to 60 degrees from the reference line B to the radially outer direction.

Therefore, when the ultrasonic beam 7 is transmitted and received in a direction perpendicular to the direction in which the crack 32b occurs, the efficiency of transmission and reception of the ultrasonic beam 7 is highest, and thus detection accuracy for the crack 32b is also high. That is, if the radiation angle of the ultrasonic beam 7 is closer to a direction perpendicular to the occurrence angle α of the crack 32b, the efficiency of reflection of the ultrasonic beam 7 becomes high, so that it becomes easier to identify the crack 32b.

Accordingly, in the present embodiment, the phased array probe 4 is placed in advance at a position on the outer circumferential surface of the retaining ring 35 that is located in a direction estimated to be perpendicular to the occurrence angle α of the crack 32b. Specifically, the placement position of the phased array probe 4 can be determined in advance on the basis of the dimensions such as the outer diameter of the rotor 3, the shape of the teeth 32, and the thickness of the retaining ring 35, in consideration of the distance from the tooth shoulder portion 32a to the outer circumferential surface of the retaining ring 35.

In addition, even in this case, the actual occurrence angle α of the crack 32b is not constant, and there is a possibility that the crack 32b occurs within an angle range of 45 degrees to 60 degrees from the reference line B to the radially outer direction. Accordingly, in order to enhance detection accuracy for the crack 32b, sector scan is performed so that the direction of the ultrasonic beam 7 radiated from the phased array probe 4 is temporally changed within a certain angle range. Specifically, in the case where the frequency of the ultrasonic beam 7 radiated from the phased array probe 4 is 2.25 MHZ, sector scan is performed with the beam transmission angle set in a range of 20 degrees to 70 degrees so as to aim at the part where the crack 32b occurs.

Thus, even if the occurrence angle α of the crack 32b is in a certain angle range of 45 degrees to 60 degrees from the reference line B, the ultrasonic beam 7 can be transmitted and received in a direction perpendicular to the occurrence angle α of the crack 32b. Therefore, it is possible to enhance detection accuracy for the crack 32b with the phased array probe 4 placed at the same fixed position, without moving the phased array probe 4 along the outer circumferential surface of the retaining ring 35 to search for an optimum position as in conventional case.

As described above, in the present embodiment, with the phased array probe 4 placed in advance at a fixed position considered to be optimum for transmission and reception of the ultrasonic beam 7 on the outer circumferential surface of the retaining ring 35, sector scan is performed to radiate the ultrasonic beam 7 to a part where a crack 32b is assumed to occur, from the outer circumferential surface of the retaining ring 35, whereby whether or not a crack has occurred can be inspected. Thus, the effort for searching for an optimum placement position of the probe on the retaining ring 35 as in conventional case can be eliminated, and the efficiency of transmission and reception of the ultrasonic beam 7 is high. Therefore, it is possible to easily and reliably inspect whether or not a crack has occurred at the tooth shoulder portion 32a, from a part on the retaining ring 35, within a short time.

In the case of using the ultrasonic flaw detection device provided with the phased array probe 4 in order to inspect whether or not a crack has occurred at the tooth shoulder portion 32a, the operation unit 51 of the ultrasonic flaw detection device body 5 is operated to perform transmission and reception of the ultrasonic beam 7 by the phased array probe 4. At this time, the frequency and the transmission angle of the ultrasonic beam 7 are adjusted using the operation unit 51, and transmission control for the ultrasonic beam 7 to be radiated from the phased array probe 4 is performed by the control unit 52. Then, a reflected wave from the crack 32b occurring at the tooth shoulder portion 32a is received by the wave transmission/reception unit 41 and transmitted via the cable 6 to the control unit 52 of the ultrasonic flaw detection device body 5. The control unit 52 generates a flaw detection image, and the flaw detection image is displayed on the display unit 53. As described above, in the present embodiment, it is possible to inspect whether or not a crack 32b has occurred in a state in which the rotor 3 of the electric generator is inserted in the stator 2, and thus the effort for detachment work for components such as the retaining ring 35, and the like, can be eliminated.

Figure 4:
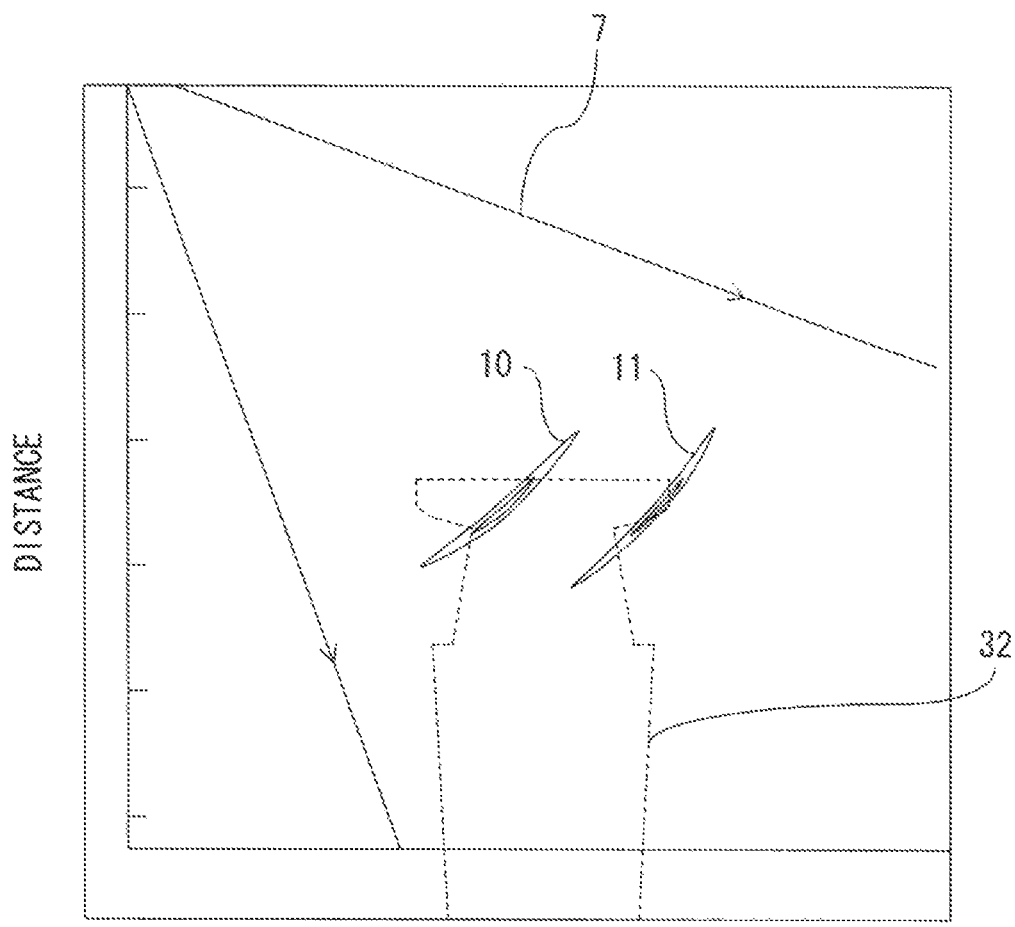
FIG. 4 illustrates an example of a screen indicating a result of inspecting whether or not a crack has occurred at a tooth shoulder portion, using the ultrasonic flaw detection device shown in FIG. 3.

FIG. 4 shows an example of a flaw detection image displayed on the display unit 53 of the ultrasonic flaw detection device body 5. A dotted line is a virtual line indicating the tooth 32 part which is subjected to flaw detection. Of two reflection waveforms indicated by reference characters 10 and 11, one reflection waveform 10 is a waveform from the crack 32b, and the other reflection waveform 11 is a waveform from the tooth shoulder portion 32a on the side opposite to the part where the crack 32b has occurred.

The reflection waveforms 10, 11 are drawn on the basis of the direction of the ultrasonic beam 7 received by the wave transmission/reception unit 41 of the phased array probe 4 and the time period from radiation to reception. The direction and the distance from the phased array probe 4 placed on the retaining ring 35 to the tooth shoulder portion 32a where there is a possibility of occurrence of a crack are known in advance. Therefore, the reflection waveform 10 reflected perpendicularly within a range of 45 degrees to 60 degrees of the tooth shoulder portion 32a can be determined to be a waveform due to the crack 32b. If no crack has occurred, no reflection wave is obtained from there.

As described above, in order to transmit and receive the ultrasonic beam 7 in a direction perpendicular to the occurrence angle α at which there is a possibility of occurrence of a crack, sector scan is performed to radiate ultrasonic waves with a predetermined angle width from the phased array probe 4 toward a position estimated to be a crack occurrence part. Therefore, if there is any part that the ultrasonic beam 7 hits perpendicularly, the reflected wave thereof is to be received by the wave transmission/reception unit 41. This wave corresponds to the other reflection waveform 11, which is a reflection waveform obtained from the opposite-side tooth shoulder portion 32a of the tooth 32. However, this reflection waveform 11 is not a waveform from the original part where the crack 32b has occurred, and therefore is not determined to be a waveform due to a crack.

It is noted that one tooth 32 has two tooth shoulder portions 32a at the left and the right with respect to the center line A. Therefore, there is a possibility that cracks 32b occur at the respective tooth shoulder portions 32a. Therefore, in crack inspection, the phased array probe 4 transmits and receives ultrasonic beams in directions to the respective two tooth shoulder portions 32*a* estimated to be crack occurrence parts.

In the above embodiment 1, the inspection method for the case where a crack 32*b* occurs at the tooth shoulder portion 32*a* of the rotor 3 of a turbine electric generator as a rotary electric machine has been described. However, the present disclosure is not limited to application to an electric generator as described above. The present disclosure is also applicable to the case of inspecting whether or not a crack has occurred at a tooth of a rotor of an electric motor, for example.

Although the disclosure is described above in terms of an exemplary embodiment, it should be understood that the various features, aspects, and functionality described in the embodiment are not limited in their applicability to the particular embodiment with which they are described, but instead can be applied alone or in various combinations to the embodiment of the disclosure.

It is therefore understood that numerous modifications which have not been exemplified can be devised without departing from the scope of the present disclosure. For example, at least one of the constituent components may be modified, added, or eliminated.

DESCRIPTION OF THE REFERENCE CHARACTERS

- 1 frame
- 2 stator
- 3 rotor
- 31 slot
- 32 tooth
- 32*a* tooth shoulder portion
- 32*b* crack
- 34 wedge
- 35 retaining ring
- 4 phased array probe
- 41 wave transmission/reception unit
- 5 ultrasonic flaw detection device body
- 51 operation unit
- 52 control unit
- 53 display unit
- 7 ultrasonic beam
- 10 reflection waveform from crack
- 11 reflection waveform from tooth shoulder portion

The invention claimed is:

1. A rotor tooth crack inspection method for a rotary electric machine in which a rotor is rotatably provided inside a stator, the rotor has a plurality of slots radially formed in a radial direction so as to be arranged along a circumferential direction of an armature core and has teeth between the slots, field coils for generating a magnetic field are wound around the teeth and stored in the slots, and a retaining ring for fixing coil ends of the field coils is fitted at an end part on an outer circumferential side of the teeth, the rotor tooth crack inspection method inspecting whether or not a crack has occurred at a shoulder portion of each tooth, the rotor tooth crack inspection method comprising:

placing, in advance, a phased array probe at a position on an outer circumferential surface of the retaining ring that is located in a direction estimated to be perpendicular to an occurrence angle $\alpha$ which is defined as an occurrence angle of a crack, the occurrence angle $\alpha$ of the crack being within a range of 45 degrees to 60 degrees from a reference line B to the radially outer direction, where a line passing by the tooth shoulder portions perpendicularly to a center line A is defined as reference line B, the center line A extending from the center of the rotor in the radial direction of each tooth;

and performing sector scan with a beam transmission angle set in a range of 20 degrees to 70 degrees with an ultrasonic beam radiated from the phased array probe, to inspect whether or not the crack has occurred.

2. The rotor tooth crack inspection method according to claim 1, wherein whether or not the crack has occurred is inspected in a state in which the rotor is fitted inside the stator without pulling out the rotor from the stator.

\* \* \* \* \*